UNITED STATES PATENT OFFICE.

GEORG SCHÜLER, OF STETTIN, GERMANY.

PROCESS OF MAKING SUPERPHOSPHATES.

SPECIFICATION forming part of Letters Patent No. 631,181, dated August 15, 1899.

Application filed December 17, 1897. Serial No. 662,321. (No specimens.)

*To all whom it may concern:*

Be it known that I, GEORG SCHÜLER, doctor of philosophy, a subject of the King of Prussia, Emperor of Germany, residing at Stettin, in the Kingdom of Prussia, Germany, have invented new and useful Improvements in Processes of Manufacturing Double Superphosphates, of which the following is a specification.

Double superphosphate—that is to say, superphosphate containing from thirty-eight to forty-five per cent. of soluble phosphoric acid—has heretofore been obtained by mixing phosphoric acid of 1.565 specific gravity with finely-powdered rich phosphates and treating the mixture thus prepared like ordinary superphosphate—namely, by drying, disintegrating, and sifting. This process has various inconveniences. In the first place, rich and therefore dear phosphates alone can be employed; secondly, moreover, the reaction of the acid upon the phosphate remains but incomplete, so that in the finished product there is generally from four to five per cent. of insoluble phosphoric acid. As the latter is not valued, it enhances the cost of the material and lowers its grade. The result is quite different if the ground phosphate is boiled with the acid, a plan which apparently has not yet been followed for fear of the formation of pyrophosphoric acid. Nevertheless I have found this fear is groundless when working in the following manner: The usual phosphoric acid used ought to be of a specific gravity not higher than 1.5. I prefer acid of 1.38 specific gravity; but the acid may also be used as it runs from the filter-presses, and it may also be stronger than 1.38; but, as said before, it must not be beyond 1.5. The lye should have a specific gravity of at least about 1.21. The more concentrated it is the less gypsum it contains, and therefore the double superphosphate produced results of a higher grade. Moreover, the more concentrated it is the higher is its boiling-point.

I have found that double superphosphate should not be heated above 115° centigrade if it is desired to avoid the formation of pyrophosphoric acid. Phosphoric acid of 1.5 specific gravity boils at about 115° centigrade, and therefore it cannot exceed this temperature.

I proceed, for instance, as follows: Phosphoric acid of 1.38 specific gravity contains per cubic meter about four hundred and fifty kilograms of phosphoric acid, of which four hundred and five kilograms may be free acid. I mix this quantity with six hundred and forty kilograms of finely-ground Peace River phosphate of twenty-eight per cent. and boil the mixture. It begins to boil at 106° or 107° centigrade, and when the temperature has been raised to 110° centigrade the leaden boiling-pan should be emptied into stone dens or leaden cooling-pans. The solidified mass is ground, dried, and sifted as common superphosphate, containing then forty-seven per cent. of phosphoric acid soluble in water and less than one per cent. insoluble in water. (The product contains but three-fourths per cent. free phosphoric acid, compared to ten per cent. in the common forty-per-cent. double superphosphate.) The quantity of phosphate to be added should be calculated after the well-known chemical rules in such a manner that the phosphoric acid and the lime contained in the mixture will be in proper proportions to form monocalciumphosphate.

Instead of Peace River phosphate any other phosphate may be taken. Even hard phosphates, such as apatite, are easily decomposed by my boiling process. Lime phosphates are particularly adapted for use in my process. These low-grade and cheap phosphates could not till now be used in the manufacture of double superphosphate. Carbonic acid, which formerly impeded the reaction, escapes during the boiling process. Even carbonate of lime alone or caustic lime may be used instead of phosphate, and I desire it to be understood that the claims are to be interpreted as covering such equivalents.

Of course the grade of the product corresponds to the addition, so that with Algerian phosphate or with Florida hardrock fifty to fifty-one per cent., and with high-grade apatite fifty-three to fifty-four per cent. may be obtained. It must be noted that I find it to be profitable to boil mixtures with carbonate of lime or phosphates containing much of it to 110° centigrade, with ordinary phosphates to 112° and with apatite to 115° centigrade.

The commercial phosphoric acid is no pure substance in chemical sense. It always contains some monocalciumphosphate, a circumstance which I consider advantageous, as by it the complete removal of the sulphuric acid is secured. Furthermore, with regard to the fact that the quantity of additional phosphate required diminishes in the same ratio as the contents of lime in the phosphoric acid increases, it is evident that it is advantageous to get the phosphoric acid as much saturated with lime as possible, for every natural phosphate contains a proportion of sand, calcium fluoride, &c., and the less thereof added to the mixture the more easily the produced double superphosphate is obtained of a high grade. For this reason the phosphoric acid may be saturated with lime before boiling with phosphate; but I prefer the following method:

Phosphoric acid very suitable for my process is obtained by leaching ordinary superphosphates. Such lye, containing but one-third to one-fourth of the phosphoric acid in free state, requires only one-third to one-fourth of the quantity of additional phosphate required when using ordinary phosphoric acid. It is easy to obtain a double superphosphate containing fifty to fifty-four per cent., and even more, of phosphoric acid soluble in water with but three-fourths per cent. of free phosphoric acid. The superphosphate being mixed with water or a dilute lye may be leached in filter-presses, or it may be extracted by decantation or in filter-vats. By appropriate leaching I may obtain a lye of 1.21 to 1.27 specific gravity and thoroughly extracted gypsum. I prefer to work with lyes of 1.27 specific gravity, as weaker lyes require more coal for boiling and contain more gypsum, yielding a product of inferior value. For instance, a lye of 1.27 specific gravity obtained by leaching Algerian superphosphate contains about two hundred and sixty kilograms of phosphoric acid per cubic meter, of which about sixty-eight kilograms are free acid. I mix with each meter of this lye sixty kilograms of a twenty-nine and one-half per cent. Algerian phosphate, and after the scum has settled I heat the mixture. The contents of the pan begin to boil at 102° centigrade, and from 105° to 107° centigrade a further formation of scum is observed. When the boiling-point has been raised to 110° centigrade, the treatment is completed and the boiling-pan is emptied into the dens or cooling-pans, as formerly described. The resulting product contains fifty to fifty-one per cent. of phosphoric acid soluble in water. By using Peace River phosphate only forty-eight per cent. will be obtained, and with high-grade apatite or guano fifty-two per cent. and more. With weaker lyes a smaller percentage of phosphoric acid soluble in water will be obtained; but if the lye is previously concentrated and separated from the precipitated gypsum a higher percentage of phosphoric acid soluble in water will be obtained.

The required quantity of additional phosphate or carbonate of lime is calculated, as formerly stated, after the well-known rules of chemistry, so that the surplus of free acid in the lye and the surplus of base in the salt added are sufficient to form monocalciumphosphate. The most suitable boiling-point to which the mixture is evaporated depends somewhat upon the substance added. When using carbonate of lime or phosphates containing much of it, I prefer 110°. Peace River phosphate apatites and similar hard phosphates are preferably heated to 112° or even 115° centigrade.

While the common phosphoric acid produced in the usual manner is nearly free from iron and alumina, even when made of phosphates, such as Peace River phosphate, containing a good deal thereof, the lye of such superphosphates contains nearly the whole quantity of the iron and alumina of the phosphate if freshly employed. Therefore the iron and alumina should be removed from the lye before it is boiled with carbonate of lime or phosphate when a high-grade double superphosphate is required. Iron can be precipitated by the addition of any ferrocyanide, calciumferrocyanide, for instance; but I prefer to neutralize the lye almost completely and to precipitate iron and alumina together by boiling it. For example, the lye of a superphosphate of a thirty-six-per-cent. Maury county, Tennessee, phosphate (with four and one-fourth per cent. iron and alumina) contained seventy-two kilograms free phosphoric acid per cubic meter. This lye, boiled with the necessary quantity of Algerian phosphate, yields a double superphosphate of forty-three per cent. phosphoric acid soluble in water and seven and one-half per cent. insoluble therein. After having boiled the lye with fifty-two and one-half kilograms chalk containing 54.39 per cent. lime (CaO) and having separated the slimy precipitate a fifty-two per cent. double superphosphate was produced from said lye by boiling it with Algerian phosphate.

I desire it to be understood that carbonate of lime or caustic lime can be used as an equivalent of a phosphate in my process and the claims hereto appended are to be interpreted accordingly. Further, I desire it to be understood that as an equivalent of phosphoric acid I may employ substances containing the same.

Having thus described my invention, I claim as new and desire to secure by Letters Patent—

1. The process of manufacturing double superphosphate, which consists in leaching mineral superphosphate and concentrating the lye by evaporation to a specific gravity of at least about 1.21, thereby precipitating gypsum, separating the precipitate from the remaining product, which is a mixture of mono-calcium phosphate and phosphoric acid, adding to the said product comminuted phosphate and heating the mixture to a temperature of about 110° centigrade.

2. The process of manufacturing double superphosphate, which consists in producing a lye of mineral superphosphate of a specific gravity of at least about 1.21, thereby precipitating gypsum, separating the precipitate from the remaining product, adding comminuted phosphate to said product, and heating the mixture to a temperature of about 110° centigrade.

In testimony whereof I have signed my name to this specification in the presence of two subscribing witnesses.

GEORG SCHÜLER.

Witnesses:
  FRITZ HOEHREN,
  HEINRICH HARDER.